(12) United States Patent
Zhang

(10) Patent No.: US 12,176,807 B2
(45) Date of Patent: *Dec. 24, 2024

(54) SPREAD SPECTRUM ADAPTIVE ON TIME VOLTAGE CONVERTER

(71) Applicant: Texas Instruments Incorporated, Dallas, TX (US)

(72) Inventor: Junwen Zhang, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,050

(22) Filed: Oct. 6, 2023

(65) Prior Publication Data

US 2024/0030810 A1     Jan. 25, 2024

Related U.S. Application Data

(63) Continuation of application No. 17/865,744, filed on Jul. 15, 2022, now Pat. No. 11,817,777.

(51) Int. Cl.
| | |
|---|---|
| *H02M 1/44* | (2007.01) |
| *H02M 3/156* | (2006.01) |
| *H04B 1/69* | (2011.01) |

(52) U.S. Cl.
CPC ............. *H02M 1/44* (2013.01); *H02M 3/156* (2013.01); *H04B 1/69* (2013.01)

(58) Field of Classification Search
CPC ............ H02M 1/44; H02M 3/156; H04B 1/69
See application file for complete search history.

(56) References Cited

U.S. PATENT DOCUMENTS

| | | | |
|---|---|---|---|
| 7,362,191 B2 | 4/2008 | Chen et al. | |
| 7,423,494 B1 | 9/2008 | Xin-Leblanc | |
| 8,093,955 B2 | 1/2012 | Ying et al. | |
| 10,170,987 B2 | 1/2019 | Tsai et al. | |
| 10,686,375 B1 | 6/2020 | Davis-Marsh | |
| 11,177,738 B1 | 11/2021 | Pahkala et al. | |
| 11,817,777 B1 * | 11/2023 | Zhang | H02M 3/1588 |
| 2015/0244269 A1 | 8/2015 | Yu | |
| 2016/0134326 A1 | 5/2016 | Lee | |
| 2017/0093279 A1 | 3/2017 | Hezar | |
| 2018/0109176 A1 | 4/2018 | Harder | |
| 2019/0115986 A1 | 4/2019 | Goller | |
| 2020/0373835 A1 | 11/2020 | Lee | |

\* cited by examiner

*Primary Examiner* — Jue Zhang
(74) *Attorney, Agent, or Firm* — Ray A. King; Frank D. Cimino

(57) ABSTRACT

Described embodiments include a circuit for adapting the on time in a switching voltage converter that includes a first transistor having a current terminal coupled to an output voltage terminal and to its control terminal. A second transistor is coupled between the first transistor and a ground terminal, and has a control terminal coupled to the first transistor. A third transistor is coupled between the output voltage terminal and a capacitor, and has a third control terminal coupled to the first control terminal. A current source is configured to provide a current that varies linearly between a first value and a second value. A fourth transistor is coupled between terminals of the capacitor, and has a fourth control terminal. A comparator has a first comparator input coupled to the capacitor. A logic circuit has an input coupled to the comparator output, and an output coupled to the fourth control terminal.

15 Claims, 8 Drawing Sheets

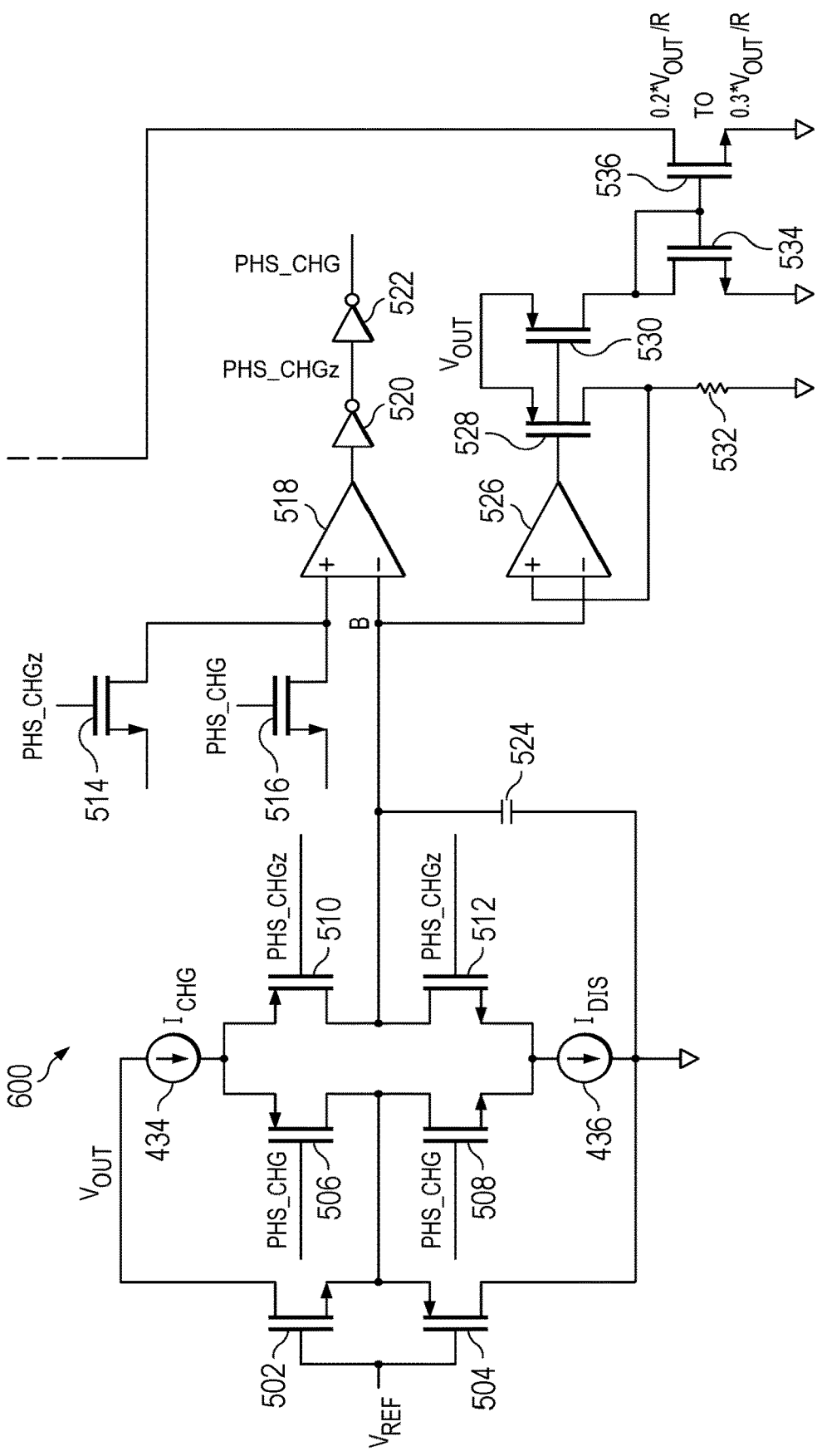

SPREAD SPECTRUM ADAPTIVE ON TIME VOLTAGE CONVERTER

CROSS-REFERENCE TO RELATED APPLICATIONS

This application is a continuation of U.S. patent application Ser. No. 17/865,744, filed Jul. 15, 2022, which is hereby incorporated herein by reference in its entirety.

TECHNICAL FIELD

This description relates to switching voltage converters and to the use of spread spectrum in switching voltage converters.

BACKGROUND

The frequency of a transmitted spread spectrum signal is intentionally varied, resulting in a larger bandwidth than the signal would have had if its frequency were not varied. Harmonic noise peaks can be converted into a flatter smoothed frequency response by blending the energy from harmonic frequencies into one another. This blending can help to reduce electromagnetic interference (EMI) in the voltage converter, as well as to reduce EMI in the host system.

Switching voltage converters can have some advantages over linear voltage converters, such as higher power efficiency and smaller circuit area. However, switching voltage converters can also have the drawback of higher EMI. EMI can be characterized as either conducted EMI or radiated EMI. Conducted EMI is transmitted through the power supply circuitry. Radiated EMI is transmitted through the air to adjacent circuitry. Switching voltage converters can generate both conducted EMI and radiated EMI.

A switching voltage converter transfers power from an input voltage source to a load when its switch node switches between a connection to the input voltage source and a connection to a ground terminal. This switching may occur at a high frequency. Many switching voltage converters switch at a fixed switching frequency, which can generate EMI at the fixed switching frequency and at integer multiples of the fixed switching frequency. In voltage converters using spread spectrum, the switching frequency is varied over a range of frequencies instead of switching at a single fixed frequency.

SUMMARY

In a first example, a circuit for adapting the on time in a switching voltage converter includes a first transistor having first and second current terminals and a first control terminal. The first current terminal is coupled to an output voltage terminal, and the first control terminal is coupled to the first current terminal. A second transistor is coupled between the second current terminal and a ground terminal, and has a second control terminal that is coupled to the second current terminal. A capacitor has first and second capacitor terminals. A third transistor is coupled between the output voltage terminal and the first capacitor terminal, and has a third control terminal coupled to the first control terminal.

A current source is coupled between the capacitor and the ground terminal. The current source is configured to provide a current that varies linearly between a first current value and a second current value. A fourth transistor is coupled between the first and second capacitor terminals, and has a fourth control terminal. A comparator has first and second comparator inputs and a comparator output, wherein the first comparator input is coupled to the second capacitor terminal. a logic circuit has a logic input and a logic output, the logic input is coupled to the comparator output, and the logic output is coupled to the fourth control terminal.

In a second example, a circuit for modulating a drive signal includes a first amplifier having first and second amplifier inputs and a first amplifier output. A first transistor is coupled between a first reference voltage terminal and the first amplifier input, and has a first control terminal. A second transistor is coupled between a second reference voltage terminal and the first amplifier input, and has a second control terminal. A first inverter has a first inverter input and a first inverter output. The first inverter input is coupled to the first amplifier output, and the first inverter output is coupled to the first control terminal.

A second inverter has a second inverter input and a second inverter output. The second inverter input is coupled to the first inverter output, and the second inverter output is coupled to the second control terminal. A second amplifier has third and fourth amplifier inputs and a second amplifier output. The third amplifier input is coupled to the second amplifier input. A third transistor is coupled between an output voltage terminal and the fourth amplifier input, and has a third control terminal coupled to the second amplifier output.

A fourth transistor has a current terminal coupled to the output voltage terminal, and has a fourth control terminal coupled to the second amplifier output. A fifth transistor is coupled between the fourth transistor and a ground terminal, and has a fifth control terminal coupled to the fourth transistor. A sixth transistor is coupled between the ground terminal and a variable current circuit that is configured to provide a current that varies linearly between a first value and a second value.

In a third example, a circuit for modulating a drive signal in a switching voltage converter includes a first amplifier having first and second amplifier inputs and a first amplifier output. A first transistor is coupled between a first reference voltage terminal and the first amplifier input, and has a first control terminal. A second transistor is coupled between a second reference voltage terminal and the first amplifier input, and has a second control terminal. A first inverter has a first inverter input and a first inverter output. The first inverter input is coupled to the first amplifier output, and the first inverter output is coupled to the first control terminal. A second inverter has a second inverter input and a second inverter output. The second inverter input is coupled to the first inverter output, and the second inverter output is coupled to the second control terminal.

A second amplifier has third and fourth amplifier inputs and a second amplifier output. The third amplifier input is coupled to the second amplifier input. A third transistor is coupled between an output voltage terminal and the fourth amplifier input, and has a third control terminal coupled to the second amplifier output. A fourth transistor has a current terminal coupled to the output voltage terminal, and has a fourth control terminal coupled to the second amplifier output.

A fifth transistor is coupled between the fourth transistor and a ground terminal, and has a fifth control terminal coupled to the fourth transistor. A comparator has first and second comparator inputs. The first comparator input is coupled to a voltage divider. A sixth transistor is coupled between the ground terminal and the second comparator input.

BRIEF DESCRIPTION OF THE DRAWINGS

FIGS. 7A and 7B (collectively FIG. 7) show a schematic diagram of an example circuit for modulating the frequency of a triangle waveform by modulating a current, then using the modulated triangle waveform to implement spread spectrum in a voltage converter.

DETAILED DESCRIPTION

In this description, the same reference numbers depict same or similar (by function and/or structure) features. The drawings are not necessarily drawn to scale.

Figure 1:
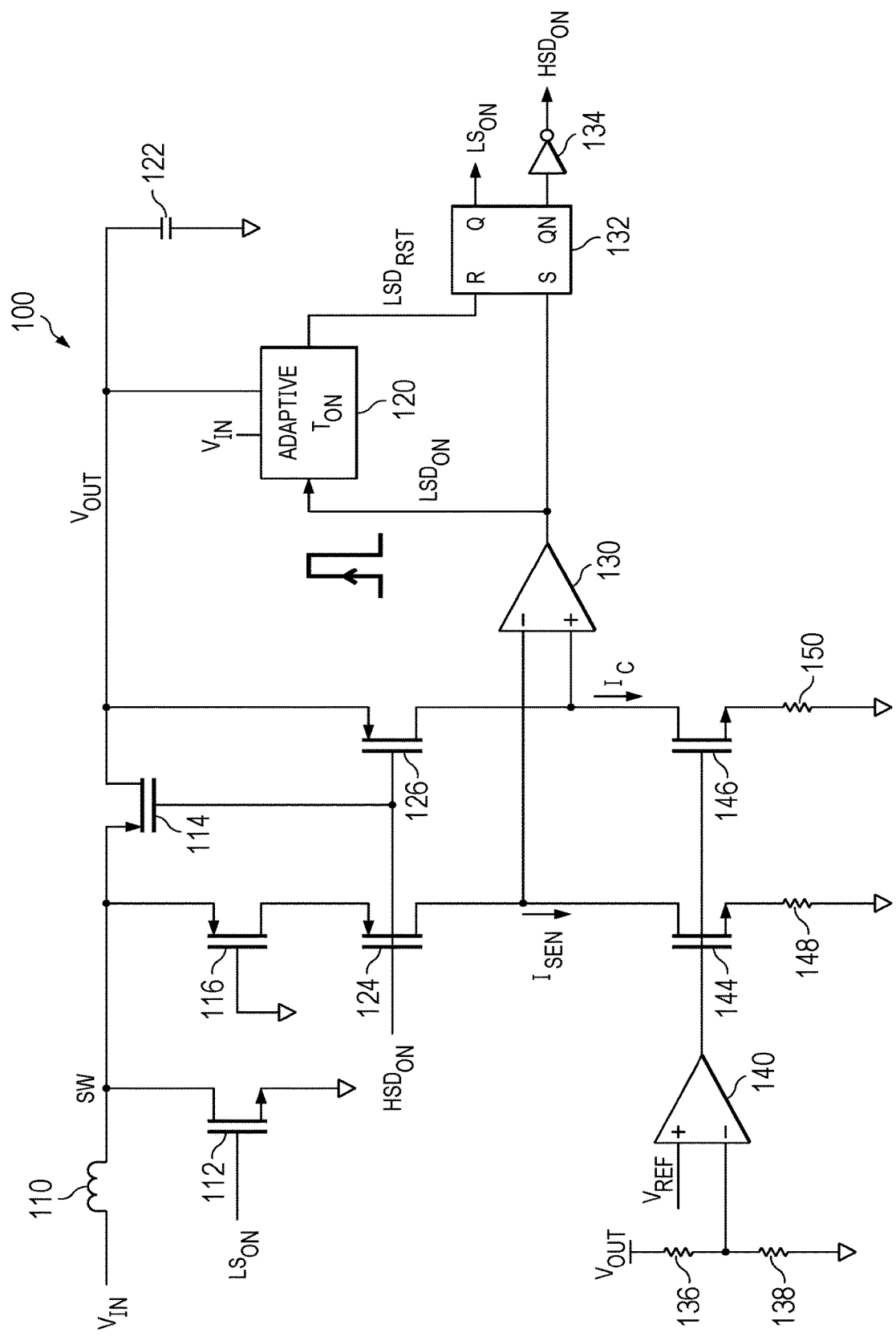
FIG. 1 shows a schematic diagram of an example adaptive on time boost voltage converter circuit.

FIG. 1 shows a schematic diagram of an example adaptive on time ($T_{on}$) boost voltage converter circuit 100 useful for reducing transistor switching noise. $T_{on}$ is the on time of the low side switching transistors in a voltage converter drive stage.

The input to the voltage converter is $V_{IN}$. Transistor 112 is the low side drive transistor for the voltage converter, and transistor 114 is the high side drive transistor for the voltage converter. Inductor 110 is coupled between the $V_{IN}$ terminal and a drain of transistor 112. A source of transistor 112 is coupled to ground. Transistor 114 is coupled between inductor 110 and an output terminal, $V_{OUT}$. Capacitor 122 is coupled between $V_{OUT}$ and ground. Transistor 116 is coupled between inductor 110 and transistor 124, and has a gate coupled to ground. Transistor 124 has a source coupled to a drain of transistor 116, and a drain coupled to a drain of transistor 144. Transistor 126 is coupled between a drain of transistor 114 and a drain of transistor 146.

The gates of transistors 114, 124 and 126 are coupled together. Transistor 144 has a drain coupled to transistor 124, and a source coupled to ground through resistor 148. Transistor 146 has a drain coupled to transistor 126, and a source coupled to ground through resistor 150. Resistors 136 and 138 are coupled in series to form a voltage divider between the output voltage terminal $V_{OUT}$ and ground.

Comparator 140 has first and second inputs and an output. The first input of comparator 140 is coupled to a reference voltage terminal. The second input of comparator 140 is coupled to a terminal connecting resistors 136 and 138. The output of comparator 140 is coupled to the gates of transistors 144 and 146.

Comparator 130 has a first input coupled to the drain of transistor 124, and a second input coupled to the drain of transistor 126. An adaptive on time circuit 120 has first, second and third inputs and an output. The output of comparator 130 is coupled to the first input of adaptive on time circuit 120. The second input of adaptive on time circuit 120 is coupled to the input voltage terminal $V_{IN}$. The third input of adaptive on time circuit 120 is coupled to the output voltage terminal $V_{OUT}$.

RS flip-flop 132 has a first input coupled to the output of adaptive on time circuit 120, and has a second input coupled to the output of comparator 130. A first output of RS flip-flop 132 is coupled to the gate of transistor 112. A second output of RS flip-flop 132 is coupled to the input of inverter 134. The output of inverter 134 is coupled to the gate of transistor 124.

Regulation of the output voltage $V_{OUT}$ is maintained by continually comparing the voltage at $V_{OUT}$ to a known reference voltage to determine whether the output voltage $V_{OUT}$ needs to increase or decrease to remain within its specified voltage. Comparator 140 compares a voltage proportional to the output voltage $V_{OUT}$ to $V_{REF}$, a stable reference voltage. The output of comparator 140 will be high if the voltage at $V_{OUT}$ needs to increase, and will be low if the voltage at $V_{OUT}$ needs to decrease to remain within the specified voltage. The output of comparator 140 is coupled to the gates of transistors 144 and 146, which generates a control current $I_C$. $I_C$ is provided as a second input to comparator 130, and is compared to $I_{SEN}$.

The currents from transistors 124 and 126, respectively, provide first and second respective inputs to comparator 130. The output of comparator 130 is coupled to the set input of RS flip-flop 132. When transistor 114 is turned on, the value of $I_{SEN}$ is initially larger than the value of $I_C$. This makes the inverting input to comparator 130 larger than the non-inverting input, so the output of comparator 130 is low. As transistor 114 remains on, the value of $I_{SEN}$ decreases and becomes lower than the value of $I_C$. This makes the non-inverting input to comparator 130 larger than the inverting input, so the output of comparator 130 is high. The output of comparator 130 is the signal $LSD_{ON}$.

Adaptive on time circuit 120 receives first, second and third respective inputs from the output of comparator 130, input voltage terminal $V_{IN}$, and output voltage terminal $V_{OUT}$, respectively. The output of adaptive on time circuit 120 is coupled to the reset input of RS flip-flop 132. The non-inverting output of RS flip-flop 132 is coupled to the gate of transistor 112, and either enables or disables current flow from $V_{IN}$ through the low side drive circuit. The inverting output of RS flip-flop 132 is coupled to the gate of a transistors 124, 126 and 114, either enabling or disabling current flow from $V_{IN}$ through the high side drive circuit.

Figure 2:
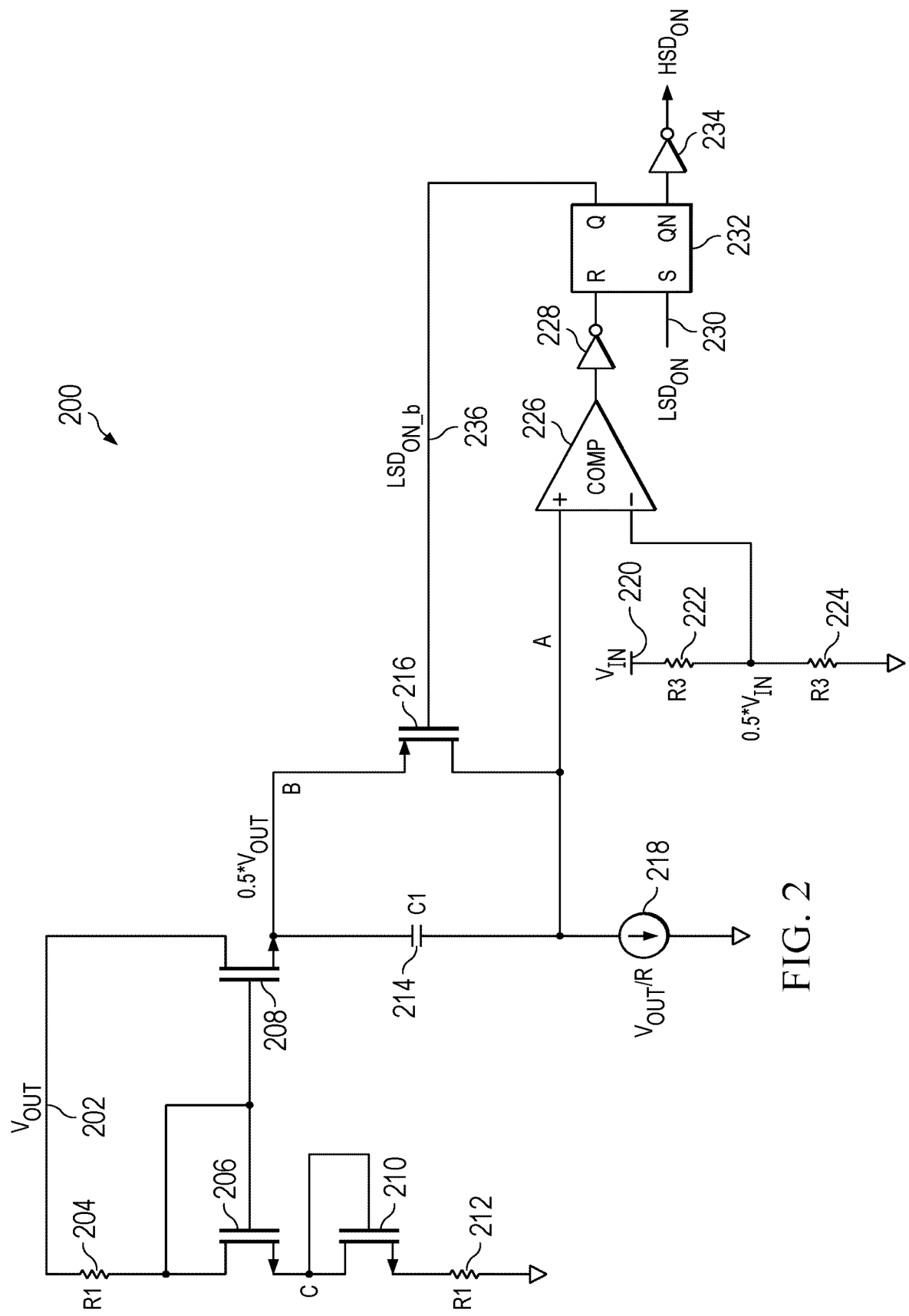
FIG. 2 shows a schematic diagram of an example implementation of an adaptive on time circuit in a boost voltage converter circuit.

FIG. 2 shows a schematic diagram of an example implementation for an adaptive on time circuit 200 in a boost voltage converter. Transistor 206 has a drain coupled to $V_{OUT}$ 202 through resistor 204. Transistor 210 has a source coupled to ground through resistor 212. The source of transistor 206 is coupled to the drain of transistor 210. Transistor 208 has a drain coupled to $V_{OUT}$ 202, and has a source coupled to capacitor C1 214 and to the source of transistor 216.

If the resistance of resistor 204 is equal to the resistance of resistor 212, the voltage at terminal C will be $0.5*V_{OUT}$. The voltage at terminal B will be approximately the same as the voltage at terminal C, so the voltage at point B will be approximately $0.5*V_{OUT}$. Capacitor C1 214 is coupled between the source of transistor 208 and the drain of transistor 216. A current source 218 is coupled between the drain of transistor 216 and ground.

Figure 3:
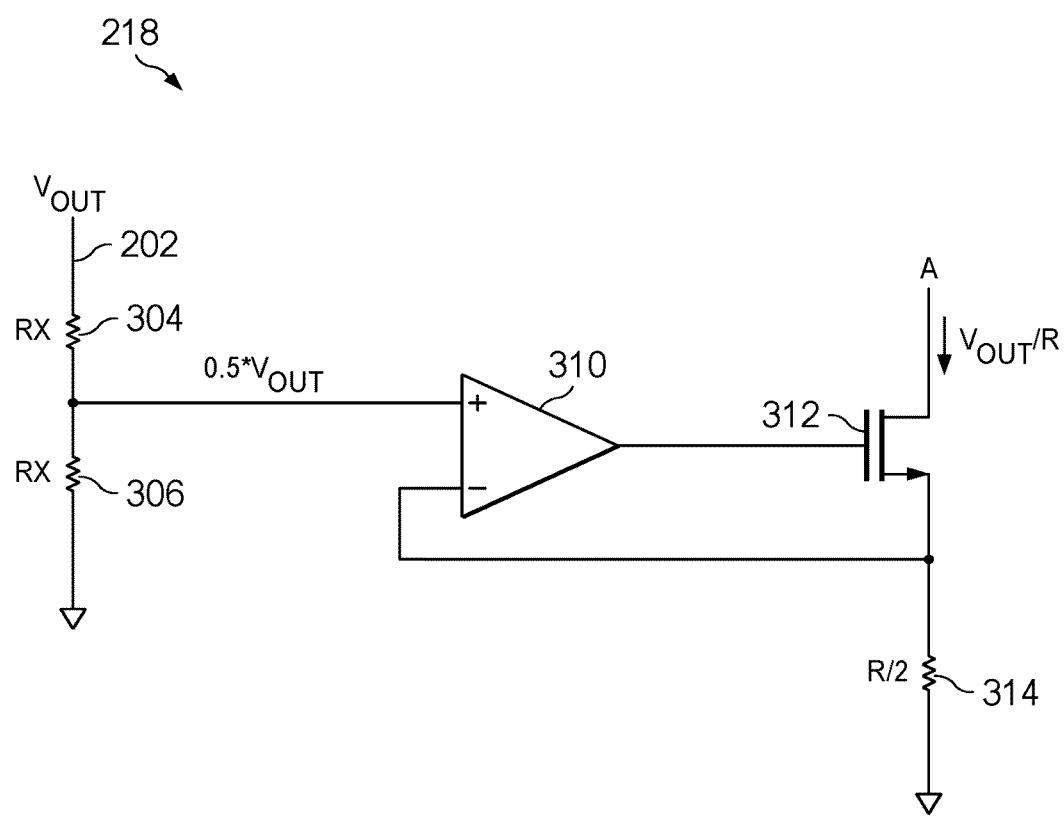
FIG. 3 shows a schematic diagram for an example implementation of a current source for an adaptive on time boost voltage converter circuit.

A schematic diagram for an example implementation of current source 218 is shown in FIG. 3. Amplifier 310 has first and second inputs and an output. Resistor 304 has value Rx and is coupled between $V_{OUT}$ 202 and the first input of amplifier 310. Resistor 306 has value Rx and is coupled between the first input of amplifier 310 and ground. Transistor 312 is coupled between the drain of transistor 216 and the second input of amplifier 310. Resistor 314 has a value of R/2 and is coupled between transistor 312 and ground. Current source 218 provides a current equal to $V_{OUT}/R$ at terminal A.

Comparator 226 has a first input coupled to current source 218 and to the drain of transistor 216. Resistor 222 has a value of R3 and is coupled between $V_{IN}$ 220 and a second input of comparator 226. Resistor 224 has a value of R3 and is coupled between the second input of comparator 226 and ground. Resistors 222 and 224 have equal resistance value and are connected in series to form a voltage divider on the voltage at $V_{IN}$ 220, so the voltage at the second input of comparator 226 is set at $V_{IN}/2$. The output of comparator 226 is coupled to the input of inverter 228. The output of inverter 228 is coupled to the reset input of RS flip-flop 232. The set input of RS flip-flop 232 is coupled to $LSD_{ON}$ 230. The non-inverting output of RS flip-flop 232 is coupled to the gate of transistor 216. The inverting output of RS flip-flop 232 is coupled to inverter 234 whose output is the signal $HSD_{ON}$.

With each pulse of the signal $LSD_{ON}$, the voltage at terminal A is discharged through current source 218 from a voltage of $0.5*V_{OUT}$ to a voltage of $0.5*V_{IN}$. This triggers the reset input of RS flip-flop 232. The drive transistor on-time is given by equation (1):

$$T_{on}=0.5*R*C*(V_{OUT}-V_{IN})/V_{OUT} \quad (1)$$

where R is twice the resistance of resistor 314, and C is the capacitance of capacitor C1 214.

The adaptive on time circuit 200 is operating at a constant frequency with no modulation. However, the adaptive on time circuit can modulate the on time by changing the value of any of the parameters in equation (1). The off time is determined by $I_{SEN}$ and $I_C$. The working frequency of the transistor drive signal is equal to $1/(R*C)$. The next cycle begins with the next pulse from $LSD_{ON}$.

To achieve better EMI performance in a voltage converter, the working frequency of the transistor drive signal can be changed. Each of the traditional methods for implementing spread spectrum into the voltage converter circuit have issues. One of these traditional methods is to replace the constant reference voltage $V_{REF}$ with a triangular waveform. However, this approach is not suitable for adaptive on time circuit 200. Equation (1) shows that modulating the reference voltage does not modulate the on time. A second traditional spread spectrum method is changing the value of either the resistance R or the capacitance C step by step. However, this second approach provides a stair-step result that introduces non-linearities in the output voltage due to the non-linear dithering.

Figure 4:
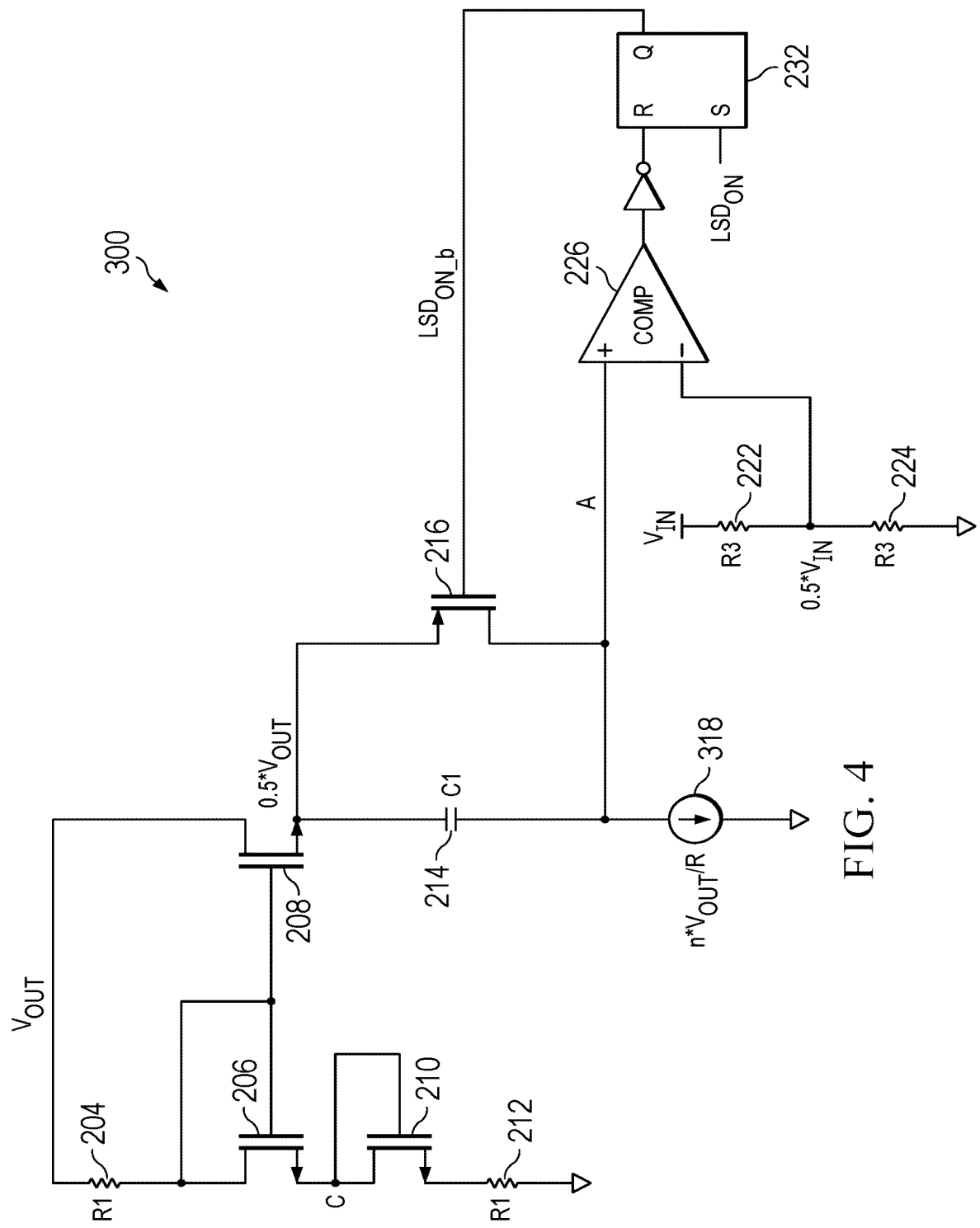
FIG. 4 shows a schematic diagram for an example implementation of an adaptive on time circuit with discharge current modulation.

FIG. 4 shows a schematic diagram for an example implementation 300 of an adaptive on time circuit with discharge current modulation. The value of the resistance R and the capacitance C in equation (1) remain constant in circuit 400. The discharge current is varied linearly instead of changing the resistance R or the capacitance C. This results in linear dithering of the working frequency within a fixed range (e.g. +1-5%).

Transistor 206 has a drain coupled to $V_{OUT}$ 202 through resistor 204. Transistor 210 has a source coupled to ground through resistor 212. The source of transistor 206 is coupled to the drain of transistor 210. Transistor 208 has a drain coupled to $V_{OUT}$ 202, and has a source coupled to capacitor C1 214 and to the source of transistor 216.

The discharge current from current source 218, $V_{OUT}/R$, is replaced with current source 318 having a current that is equal to $n*V_{OUT}/R$, where n is modulated from a first value (e.g. 95%) to a second value (e.g. 105%), and then back to the first value at a fixed rate. The working frequency also varies linearly from a first value to a second value through a feedback loop to maintain a volt-second balance. The working frequency of the modulation changes proportionally as the discharge current changes. The frequency changes with the current because the working frequency is inversely proportional to the time required to charge or discharge a capacitor from a first voltage level to a second voltage level.

Comparator 226 has a first input coupled to current source 318 and to the drain of transistor 216. Resistor 222 has a value of R3 and is coupled between $V_{IN}$ 220 and a second input of comparator 226. Resistor 224 has a value of R3 and is coupled between the second input of comparator 226 and ground. Resistors 222 and 224 have equal resistance value and are connected in series to form a voltage divider on the voltage at $V_{IN}$, so the voltage at the second input of comparator 226 is set at $V_{IN}/2$. The output of comparator 226 is coupled to the input of an inverter, which is coupled to the reset input of RS flip-flop 232. The set input of RS flip-flop 232 is coupled to $LSD_{ON}$ 230. The non-inverting output of RS flip-flop 232 is coupled to the gate of transistor 216.

The on time changes proportionally with the change in discharge current. If the discharge current increases, the on time decreases. As the on time decreases, the working period also decreases. If the discharge current decreases, the on time increases, making the working period longer. When the discharge current returns to its initial value, the working frequency changes proportionally with it. As the current decreases, the capacitor takes a longer time to charge up. As the current increases, a shorter time is required to charge the capacitor.

The discharge current is split into two components that are summed together: a fixed current and a tuned current. The tuned current changes from a first value to a second value, while the fixed current remains at a fixed current value. In one example, a spread spectrum variation of +/−5% is chosen. In this example, the fixed current is fixed at $0.75*(VOUT/R)$, and the tuned current varies from a first value of $0.2*(V_{OUT}/R)$ to a second value of $0.3*(VOUT/R)$, then back to $0.2*(VOUT/R)$ at a chosen rate of 9 KHz. In this example, the discharge current will vary from $0.95*(VOUT/R)$ to $1.05*(VOUT/R)$, then back to $0.95*(VOUT/R)$ at a 9 KHz rate. The on time and the working frequency are proportional to the discharge current and likewise vary from 95% to 105%, then back to 95% as the discharge current changes.

Figure 5:
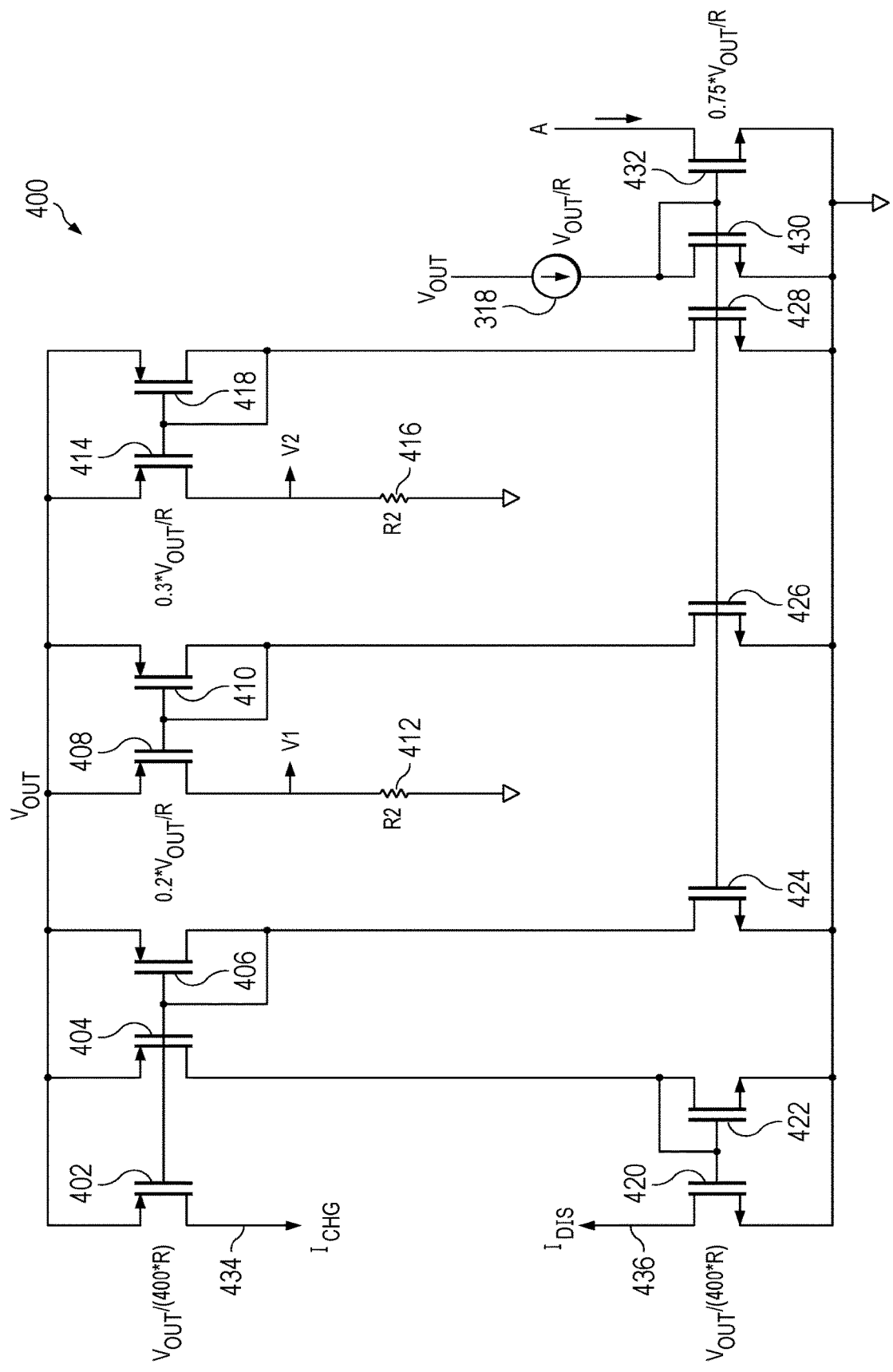
FIG. 5 shows a schematic diagram of a circuit for generating charge and discharge currents to vary a current from a first value to a second value, then back to the first value.

FIG. 5 shows a schematic diagram of a circuit 400 for generating charge and discharge currents to vary a tuned current from a first value to a second value, then back to the first value at a fixed frequency. Current source 218 provides a current equal to $V_{OUT}/R$ and is coupled to the gate and drain of transistor 430. The source of transistor 430 is coupled to ground. The fixed current, which is set at a value of $0.75*V_{OUT}/R$ in this example, flows through transistor 432. Transistor 430 and transistor 432 together form a current mirror.

Transistor 408 has a source coupled to $V_{OUT}$, and a drain coupled to voltage terminal V1. Transistor 408 provides a current of $0.2*V_{OUT}/R$, the lower value of the tuned current. Resistor 412 has a value R2 and is coupled between the drain of transistor 408 and ground. Transistor 410 has a source connected to $V_{OUT}$, and a gate and a drain coupled to a gate of transistor 408. Transistors 408 and 410 form a current mirror. Transistor 414 has a source coupled to $V_{IN}$, and a drain coupled to voltage terminal V2. Transistor 414 provides a current of $0.3*V_{OUT}/R$, the upper value of the tuned current. Resistor 416 has a value R2 and is coupled between the drain of transistor 414 and ground. Transistor 418 has a source connected to $V_{IN}$, and a gate and a drain coupled to a gate of transistor 414.

A current flows through two terminals: one terminal at a voltage V1 and the other terminal at a voltage V2. For each of them, the current goes through a resistor having a resistance of R2. The voltages at terminals V1 and V2 are shown in equations (2) and (3), respectively.

$$V1=0.2*V_{OUT}*(R2/R) \tag{2}$$

$$V2=0.3*V_{OUT}*(R2/R) \tag{3}$$

Transistor 402 has a source coupled to $V_{OUT}$, and a drain coupled to a current terminal $I_{CHG}$ 434. The magnitude of the current through current terminal $I_{CHG}$ 434 is equal to $V_{OUT}/(400*R)$. Transistor 404 has a source coupled to $V_{OUT}$, and a gate coupled to a gate of transistor 402. Transistor 406 has a source coupled to $V_{OUT}$, and a drain and a gate coupled to the gate of transistor 404. Transistors 402, 404 and 406 together form a current mirror.

Transistor 420 has a source coupled to ground, and a drain coupled to a current source $I_{DIS}$ 436. The magnitude of the current through current source $I_{DIS}$ 436 is equal to $V_{OUT}/(400*R)$. Transistor 422 has a source coupled to ground, and a gate coupled to a gate of transistor 420. Transistors 420 and 422 together form a current mirror. Transistor 424 has a source coupled to ground, and a drain and a gate coupled to the gate of transistor 422.

Figure 6:
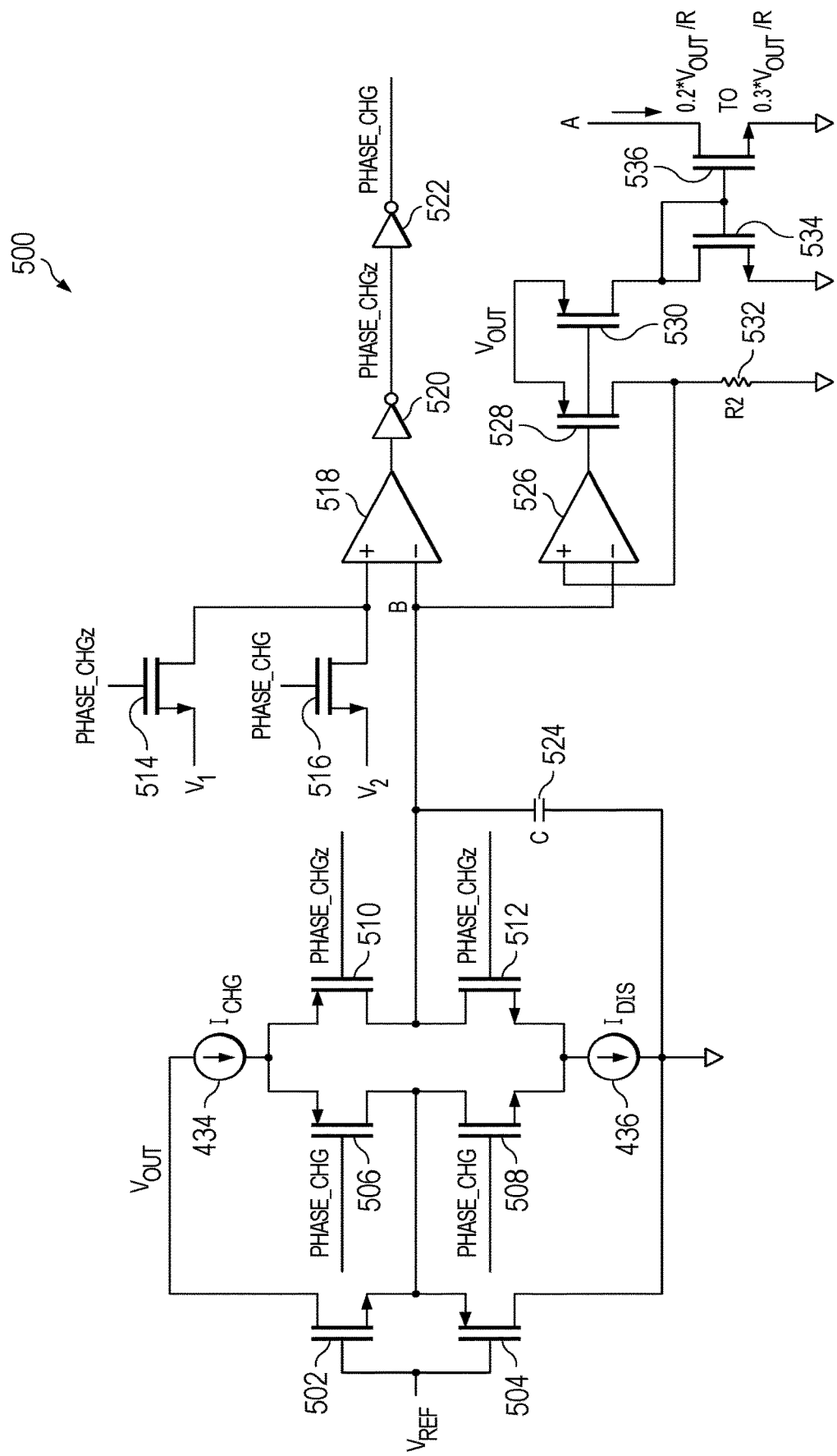
FIG. 6 shows a schematic diagram of an example circuit for generating a triangle waveform by modulating a current to charge and discharge a capacitor.

FIG. 6 shows a circuit 500 for generating a triangle voltage waveform by modulating a current to charge and discharge a capacitor. Transistors 502 and 504 are coupled in series between $V_{OUT}$ and ground. The gates of transistor 502 and 504 are coupled to a voltage reference $V_{REF}$. Current source $I_{CHG}$ 434 has a first terminal coupled to $V_{OUT}$, and a second terminal coupled to a source of transistor 506 and to a source of transistor 510.

Transistor 506 has a drain coupled to the source of transistor 502 and the source of transistor 504. Transistor 508 has a drain coupled to the drain of transistor 506 and a source coupled to a first terminal of a current source $I_{DIS}$ 436. A second terminal of current source $I_{DIS}$ 436 is coupled to ground. Capacitor 524 is coupled between the drain of transistor 512 and ground.

Transistor 514 is coupled between voltage terminal V1 and a first input to amplifier 518. Transistor 516 is coupled between voltage terminal V2 and the first input to amplifier 518. Amplifier 518 has a second input coupled to the drain of transistor 512, and has an output that is coupled to an input of inverter 520. The output of inverter 520 is coupled to the input of inverter 522 and to the gate of transistor 514. The output of inverter 522 is coupled to the gate of transistor 516.

Amplifier 526 has first and second inputs and an output. The first input of amplifier 526 is coupled to the second input of amplifier 518. Transistor 528 is coupled between $V_{OUT}$ and the second input of amplifier 526, and has a gate coupled to the output of amplifier 526. Resistor 532 is coupled between the second input of amplifier 526 and ground. Transistor 530 has a source coupled to $V_{OUT}$, and a gate coupled to the gate of transistor 528. Transistor 534 is coupled between the drain of transistor 530 and ground, and has a gate coupled to the drain of transistor 530. Transistor 536 is coupled between terminal A and ground, and has a gate coupled to the gate of transistor 534.

The voltage at the second input of amplifier 518, terminal B, varies between first and second values in a triangular waveform. The voltage variation is created by charging and discharging terminal B with a charge and a discharge current. The voltage at terminal B varies from V1 to V2, then back to V1 at a frequency $f_{dither}$, which is shown in equation (4):

$$f_{dither}=1/(80*R2*C) \tag{4}$$

where R2 is the resistance of resistor 532, and C is the capacitance of capacitor 524. The voltage variation at terminal B creates a triangular voltage waveform. Resistor 532 transforms the varying voltage at terminal B to a varying current, which varies from a current of $0.2*V_{OUT}/R$ to a current of $0.3*V_{OUT}/R$.

Figure 7A:
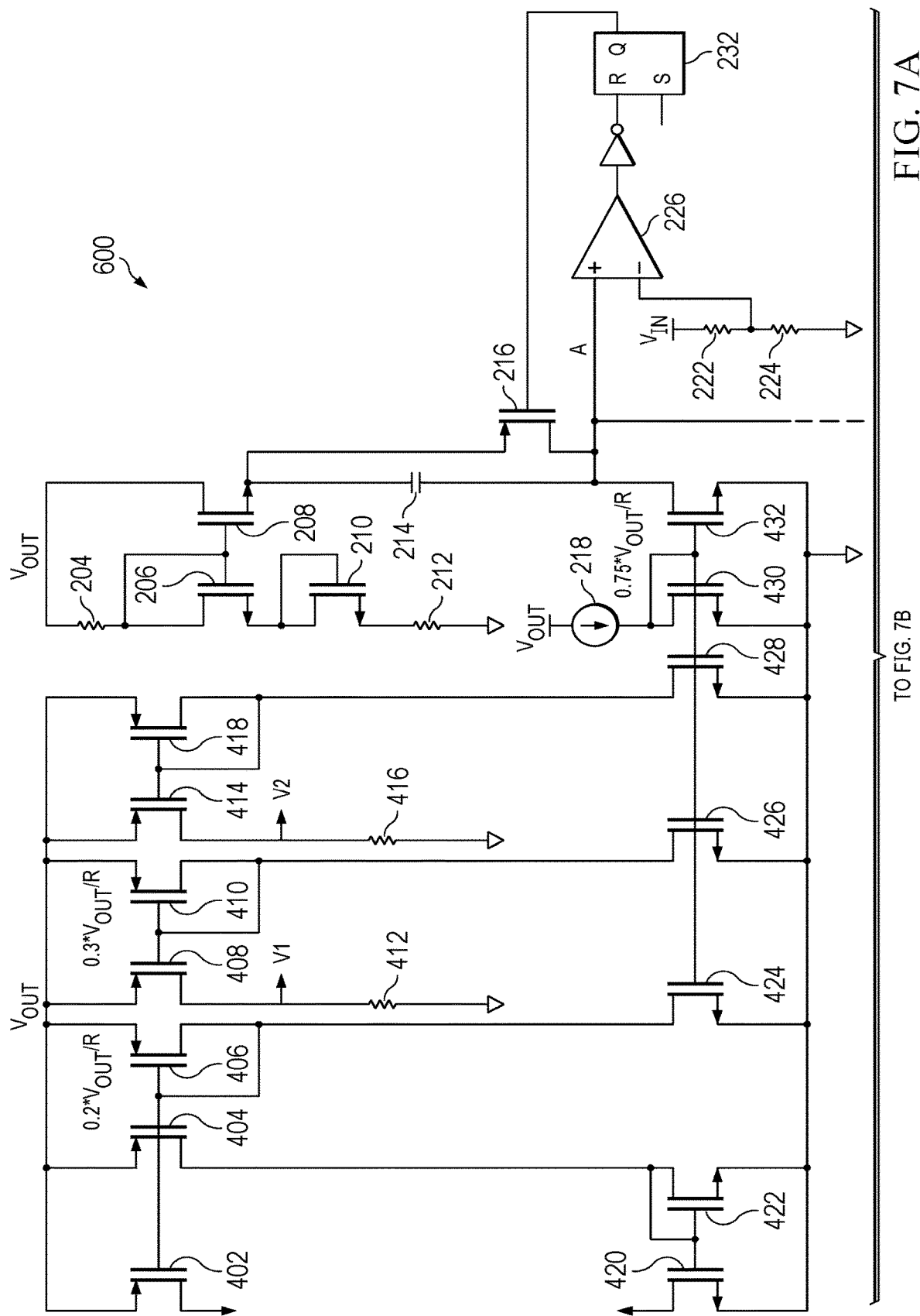

FIG. 7 shows a circuit 600 for modulating the frequency of a triangle waveform by modulating a current, then using the modulated triangle waveform to implement spread spectrum in a voltage converter. Current source 218 provides a current equal to $V_{OUT}/R$ and is coupled to the gate and the drain of transistor 430. The source of transistor 430 is coupled to ground. The fixed current, which is fixed at a value of $0.75*V_{OUT}/R$ in this example, flows through transistor 432, which is coupled between capacitor 214 and ground. Transistor 430 and transistor 432 together form a current mirror.

Transistor 408 has a source coupled to $V_{OUT}$, and a drain coupled to voltage terminal V1. Transistor 408 provides a current of $0.2*V_{OUT}/R$, the lower value of the tuned current. Resistor 412 has a value R2 and is coupled between the drain of transistor 408 and ground. Transistor 410 has a source connected to $V_{OUT}$, and a gate and a drain coupled to a gate of transistor 408. Transistors 408 and 410 form a current mirror. Transistor 414 has a source coupled to $V_{IN}$, and a drain coupled to voltage terminal V2. Transistor 414 provides a current of $0.3*V_{OUT}/R$, the upper value of the tuned current. Resistor 416 has a resistance of R2 and is coupled between the drain of transistor 414 and ground. Transistor 418 has a source connected to $V_{IN}$, and a gate and a drain coupled to a gate of transistor 414.

Transistor 402 has a source coupled to $V_{OUT}$, and a drain coupled to a current terminal $I_{CHG}$ 434. The magnitude of the current through current terminal $I_{CHG}$ 434 is equal to $V_{OUT}/(400*R)$. Transistor 404 has a source coupled to $V_{OUT}$, and a gate coupled to a gate of transistor 402. Transistor 406 has a source coupled to $V_{OUT}$, and a drain and a gate coupled to the gate of transistor 404. Transistors 404 and 406 together form a current mirror.

Transistor 420 has a source coupled to ground, and a drain coupled to a current source $I_{DIS}$ 436. The magnitude of the current through current source $I_{DIS}$ 436 is equal to $V_{OUT}/(400*R)$. Transistor 422 has a source coupled to ground, and a gate coupled to a gate of transistor 420. Transistors 420 and 422 together form a current mirror. Transistor 424 has a source coupled to ground, and a drain and a gate coupled to the gate of transistor 422.

Transistors 502 and 504 are coupled in series between $V_{OUT}$ and ground. The gates of transistor 502 and 504 are coupled to a voltage reference $V_{REF}$. Current source $I_{CHG}$ 434 has a first terminal coupled to $V_{OUT}$, and a second terminal coupled to a source of transistor 506 and to a source of transistor 510.

Transistor 506 has a drain coupled to the source of transistor 502 and the source of transistor 504. Transistor

508 has a drain coupled to the drain of transistor 506 and a source coupled to a first terminal of a current source $I_{DIS}$ 436. A second terminal of current source $I_{DI}S$ 436 is coupled to ground. Capacitor 524 is coupled between the drain of transistor 512 and ground.

Transistor 514 is coupled between voltage terminal V1 and a first input to amplifier 518. Transistor 516 is coupled between voltage terminal V2 and the first input to amplifier 518. Amplifier 518 has a second input coupled to the drain of transistor 512, and has an output that is coupled to an input of inverter 520. The output of inverter 520 is coupled to the input of inverter 522 and to the gate of transistor 514. The output of inverter 522 is coupled to the gate of transistor 516.

Amplifier 526 has first and second inputs and an output. The first input of amplifier 526 is coupled to the second input of amplifier 518. Transistor 528 is coupled between $V_{OUT}$ and the second input of amplifier 526, and has a gate coupled to the output of amplifier 526. Resistor 532 is coupled between the second input of amplifier 526 and ground. Transistor 530 has a source coupled to $V_{OUT}$, and a gate coupled to the gate of transistor 528. Transistor 534 is coupled between the drain of transistor 530 and ground, and has a gate coupled to the drain of transistor 530. Transistor 536 is coupled between the drain of transistor 216 and ground, and has a gate coupled to the gate of transistor 534.

The voltage at the second input of amplifier 518, terminal B, varies between first and second values in a triangular waveform. The voltage variation is created by charging and discharging terminal B with a charge and a discharge current. The voltage at terminal B varies from V1 to V2, then back to V1. The voltage variation at terminal B creates a triangular voltage waveform. Resistor 532 transforms the varying voltage at terminal B to a varying current, which varies from a current of $0.2*V_{OUT}/R$ to a current of $0.3*V_{OUT}/R$.

The switching frequency is not changed by varying a resistance or a capacitance. Instead, the switching frequency is varied by tuning a discharge current linearly to produce a linearly varying frequency. Further, the circuit of FIG. 7 allows the frequency variation to remain controlled in a fixed frequency range even if a large voltage variation occurs in $V_{IN}$ or $V_{OUT}$, which is not possible by tuning the reference voltage because the working frequency would vary with a variation in $V_{IN}$ or $V_{OUT}$.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit for varying a switching voltage converter on-time, the circuit comprising:
    a first transistor having first and second current terminals and a first control terminal, the first current terminal coupled to an output voltage terminal;
    a capacitor having first and second capacitor terminals, wherein the first capacitor terminal is coupled to the second current terminal;
    a second transistor having third and fourth current terminals and a second control terminal, wherein the third current terminal is coupled to the second current terminal, and the fourth current terminal is coupled to the second capacitor terminal;
    a current source coupled between the second capacitor terminal and a ground terminal, wherein the current source is configured to provide a current varying linearly between a first current value and a second current value;
    a comparator having first and second comparator inputs and a comparator output, wherein the first comparator input is coupled to the fourth current terminal; and
    a logic circuit having a logic input and a logic output, wherein the logic input is coupled to the comparator output, and the logic output is coupled to the second control terminal.

2. The circuit of claim 1, wherein the current source includes:
    a first resistor having first and second resistor terminals, the first resistor terminal coupled to the output voltage terminal;
    a second resistor coupled between the second resistor terminal and the ground terminal;
    an amplifier having first and second amplifier inputs and an amplifier output, the first amplifier input coupled to the second resistor terminal;
    a third resistor coupled between the second amplifier input and the ground terminal; and
    a third transistor coupled between the second amplifier input and the capacitor, and having a third control terminal coupled to the amplifier output.

3. The circuit of claim 1, further comprising:
    a first resistor coupled between the output voltage terminal and the first current terminal; and
    a second resistor coupled between the second transistor and the ground terminal.

4. The circuit of claim 3, wherein the first and second resistors have an equal resistance.

5. The circuit of claim 1, wherein the second comparator input is coupled to a voltage divider that includes:
    a first resistor coupled between the output voltage terminal and the second amplifier input; and
    a second resistor coupled between the first resistor and the ground terminal.

6. The circuit of claim 5, wherein the first and second resistors have an equal resistance.

7. The circuit of claim 1, wherein the logic circuit includes:
    an inverter having an inverter input and an inverter output, the inverter input coupled to the comparator output; and
    a flip-flop having an input coupled to the inverter output, and having an output coupled to the second control terminal.

8. The circuit of claim 1, wherein the linear variation of the current provided by the current source produces a triangle waveform.

9. The circuit of claim 1, wherein the current provided by the current source includes a constant current component and a varying current component.

10. The circuit of claim 9, wherein the constant current component is 0.75 times a reference current, and the varying current component varies from 0.2 times the reference current to 0.3 times the reference current.

11. A circuit for modulating a drive signal, comprising:
a first switch having first and second switch terminals and a first switch control terminal, wherein the first switch terminal is coupled to a first voltage terminal;
a second switch having third and fourth switch terminals and a second switch control terminal, wherein the third switch terminal is coupled to a second voltage terminal;
a first amplifier having first and second amplifier inputs and a first amplifier output, wherein the first amplifier input is coupled to the second switch terminal and the fourth switch terminal;
a first inverter having a first inverter input and a first inverter output, wherein the first inverter input is coupled to the first amplifier output, and the first inverter output is coupled to the first switch control terminal;
a second inverter having a second inverter input and a second inverter output, wherein the second inverter input is coupled to the first inverter output, and the second inverter output is coupled to the second switch control terminal;
a second amplifier having third and fourth amplifier inputs and a second amplifier output, wherein the third amplifier input is coupled to the second amplifier input;
a first transistor coupled between an output voltage terminal and the fourth amplifier input, and having a first transistor control terminal coupled to the second amplifier output;
a second transistor coupled to the output voltage terminal, and having a second transistor control terminal coupled to the second amplifier output;
a third transistor coupled between the second transistor and a ground terminal, and having a third transistor control terminal coupled to the second transistor; and
a fourth transistor coupled between the ground terminal and a variable current circuit configured to provide a current that varies linearly between a first current value and a second current value.

12. The circuit of claim 11, further comprising a resistor coupled between the fourth amplifier input and the ground terminal.

13. The circuit of claim 12, further comprising a capacitor coupled between the second amplifier input and the ground terminal.

14. The circuit of claim 13, further comprising:
a first current source coupled to the output voltage terminal;
a second current source coupled to the ground terminal;
a fifth transistor coupled between the first current source and the second amplifier input, and having a fifth transistor control terminal coupled to the first inverter output; and
a sixth transistor coupled between the second amplifier input and the second current source, and having a sixth transistor control terminal coupled to the first inverter output.

15. The circuit of claim 14, wherein the variable current circuit includes:
a comparator having first and second comparator inputs and a comparator output, wherein the first comparator input is coupled to the fifth transistor, and the second comparator input is coupled to a voltage divider circuit; and
a logic circuit having a logic input and a logic output, wherein the logic input is coupled to the comparator output, and the logic output is coupled to the fifth transistor control terminal.

\* \* \* \* \*